United States Patent
Rajan et al.

(10) Patent No.: US 10,129,186 B2
(45) Date of Patent: Nov. 13, 2018

(54) SERVICE FUNCTION CHAIN (SFC) DATA COMMUNICATIONS WITH SFC DATA IN VIRTUAL LOCAL AREA NETWORK IDENTIFIER (VLAN ID) DATA FIELDS

(71) Applicant: Nicira, Inc., Palo Alto, CA (US)

(72) Inventors: Dharmaraja Rajan, Miami, FL (US); Sami Boutros, Union City, CA (US); Philip Kippen, Fall City, WA (US)

(73) Assignee: Nicira, Inc., Palo Alto, CA (US)

( * ) Notice: Subject to any disclaimer, the term of this patent is extended or adjusted under 35 U.S.C. 154(b) by 15 days.

(21) Appl. No.: 15/371,934

(22) Filed: Dec. 7, 2016

(65) Prior Publication Data

US 2018/0159801 A1    Jun. 7, 2018

(51) Int. Cl.
*H04L 12/931* (2013.01)
*H04L 29/06* (2006.01)
*H04L 12/713* (2013.01)
*H04L 12/46* (2006.01)
*H04L 12/741* (2013.01)

(52) U.S. Cl.
CPC .......... *H04L 49/70* (2013.01); *H04L 12/4641* (2013.01); *H04L 45/586* (2013.01); *H04L 45/74* (2013.01); *H04L 69/22* (2013.01)

(58) Field of Classification Search
CPC ... H04L 49/70; H04L 12/4641; H04L 45/586; H04L 45/74; H04L 69/22
See application file for complete search history.

(56) References Cited

U.S. PATENT DOCUMENTS

| | | | |
|---|---|---|---|
| 2017/0208011 A1* | 7/2017 | Bosch | H04L 47/25 |
| 2017/0251065 A1* | 8/2017 | Furr | H04L 67/16 |
| 2017/0359255 A1* | 12/2017 | Manghirmalani | H04L 69/22 |
| 2018/0026911 A1* | 1/2018 | Anholt | H04L 47/805 |

* cited by examiner

*Primary Examiner* — Duc C Ho (57) ABSTRACT

A data system transfers data packets over Service Function Chains (SFCs). A classifier receives the packets and determines SFC Identifiers (IDs) and metadata. The classifier inserts the SFC IDs and metadata in Virtual Local Area Network (VLAN) ID data fields of the packets. The classifier transfers the classified packets to a forwarder. The forwarder identifies the SFC IDs and metadata from the VLAN ID data fields. The forwarder selects network functions based on the SFC IDs and metadata. The forwarder transfers the packets having the SFC IDs and metadata in the VLAN ID data fields to the selected network functions. The selected network functions identify the SFC IDs and metadata from the VLAN ID data fields. The network functions process the packets based on the SFC IDs, metadata, and configured policies to perform functions like network address translation, firewall, deep packet inspection, and others.

20 Claims, 9 Drawing Sheets

SERVICE FUNCTION CHAIN (SFC) DATA COMMUNICATIONS WITH SFC DATA IN VIRTUAL LOCAL AREA NETWORK IDENTIFIER (VLAN ID) DATA FIELDS

TECHNICAL BACKGROUND

In the classic computer model, computer hardware executes operating system software and application software. The computer hardware includes components like Central Processing Units (CPUs), data memories, Input/Output (I/O) transceivers, and user interfaces. The CPUs execute the operating system to control the computer hardware. The applications execute on the CPUs to interact with the operating system, and the operating system controls the computer hardware for the applications.

A virtualization layer was introduced to free the interface between the computer hardware and the application software. The virtual layer may interact with a variety of operating systems that support numerous software applications. The virtual layer also interacts with a variety of computer hardware. In many virtualization examples, custom applications interact with the virtualization layer to deploy specialized data communication services over a host of general-purpose servers that offer both high-performance and cost-effectiveness. In some virtual environments, hypervisors provide the virtual layer to the operating systems, and in other virtual environments, the operating systems implement containers to support the applications.

Data communication networks have also been virtualized. Before virtualization, data communication networks were comprised of interconnected network elements, such as data switches linked by cabling. An exemplary data communication protocol is Ethernet as described in Institute of Electrical and Electronics Engineers (IEEE) standard 802.3. An Ethernet Local Area Network (LAN) exchanges Ethernet frames that transport user data. The Ethernet frames have Ethernet headers that indicate network addressing and metadata. Ethernet switches interpret the headers to switch Ethernet frames between the Ethernet ports.

Ethernet has been enhanced with Virtual LAN (VLAN) technology as described in IEEE standard 802.1Q. Ethernet VLAN inserts a VLAN Identifier (ID) into the existing Ethernet header. Ethernet switches interpret VLAN IDs to isolate network segments or "broadcast" domains. VLAN allows endpoints to be arbitrarily assigned to the broadcast domain based on the VLAN ID and not the physical location. Ethernet VLAN was further developed with Ethernet VLAN QinQ technology described in IEEE standard 802.1ad. Ethernet VLAN QinQ allows multiple VLAN IDs to be inserted in an existing Ethernet frame to support in-frame Ethernet VLAN multiplexing.

To support Ethernet in virtualized networking environments, Virtual Extensible LAN (VXLAN) was created. VXLAN is described in Internet Engineering Task Force (IETF) Request For Comment (RFC) 7348. VXLAN encapsulates an Ethernet frame in a Layer four packet that has a separate VXLAN header. The VXLAN header specifies a virtual tunnel for the Ethernet traffic. Moreover, a VXLAN header may identify a virtual tunnel for a group of multiplexed Ethernet VLANs.

Specialized control and user plane functions that are used within the construct of mobile and wireline services are also being virtualized. The virtualization of network functions is referred to Network Function Virtualization (NFV), while the individual Virtual Network Functions are referred to as VNFs. An overall platform approach to NFV is described in European Telecommunication Standards Institute (ETSI) NFV publications. An NFV Infrastructure (NFVI) platform at the simplest level implements general-purpose computer hardware and virtualization software or containers. The virtualization software includes a hypervisor that has a virtual switch. The virtual switches interface with the VNFs.

VNFs comprise networking software that is executed by the computer hardware under virtual layer control. The NFVI platform hosts and manages the VNFs to deliver data communication services to external data machines. Many data communication services require a set of VNFs to process individual user data packets. This set of VNFs is called a Service Function Chain (SFC). For example, one VNF may filter the user data packet for parental control while another VNF translates network addressing in the user data packet.

When a user data packet initially enters a virtual service construct, a VNF uses service policy to classify the user data packet for service chain processing. The classifier then encodes information specifying the target VNFs to be used in the SFC chain and forwards the user data packet to the first VNF in the selected SFC. The VNFs in the SFC process the user data packets sequentially, as specified in the SFC VNF order. The VNFs use the overlay network virtualization layer to forward the user data packets from one VNF to the other per the unique sequential order. When the VNFs in the SFC complete their tasks, the virtual layer may forward the processed user data packet to an outbound next hop in the virtual or non-virtual switched or routed network domain.

The use of a Network Services Header (NSH) has been previously introduced to facilitate the use of Service Function Chaining and related Metadata transport and insertion. NSH is described by IETF-SFC-NSH working group publications. The NSH is inserted between the VXLAN header and the Ethernet frame. The NSH carries service data like SFC ID and SFC metadata. The SFC metadata may comprise VNF counts, user data formats, user data applications, user Quality-of-Service (QoS) levels, and the like. The VNFs and virtual switches use the NSH data to process the user data packets. For example, a VNF may determine that a user data packet is related to a special user application that should receive a better QoS level. The VNF can modify the QoS level within the NSH to improve the subsequent QoS applied to the user data packet by the VNFs in the SFC.

The NSH adds a significant amount of overhead data on a per-packet basis. The NSH also consumes user data space and consumes valuable network resources.

TECHNICAL OVERVIEW

A data communication system transfers user data packets over Service Function Chains (SFCs). A data classifier receives the user packets and determines SFC Identifiers (IDs) and SFC metadata. The data classifier inserts the SFC IDs and metadata in Virtual Local Area Network (VLAN) ID data fields of the user data packets. The data classifier transfers the classified user data packets to a data forwarder. The data forwarder identifies the SFC IDs and metadata from the VLAN ID data fields. The data forwarder selects network functions based on the SFC IDs and metadata. The data forwarder transfers the user data packets having the SFC IDs and metadata in the VLAN ID data fields to the selected network functions. The selected network functions identify the SFC IDs and metadata from the VLAN ID data fields. In the SFCs, the network functions process the user data packets based on the SFC IDs and metadata.

DETAILED DESCRIPTION

Figure 1:
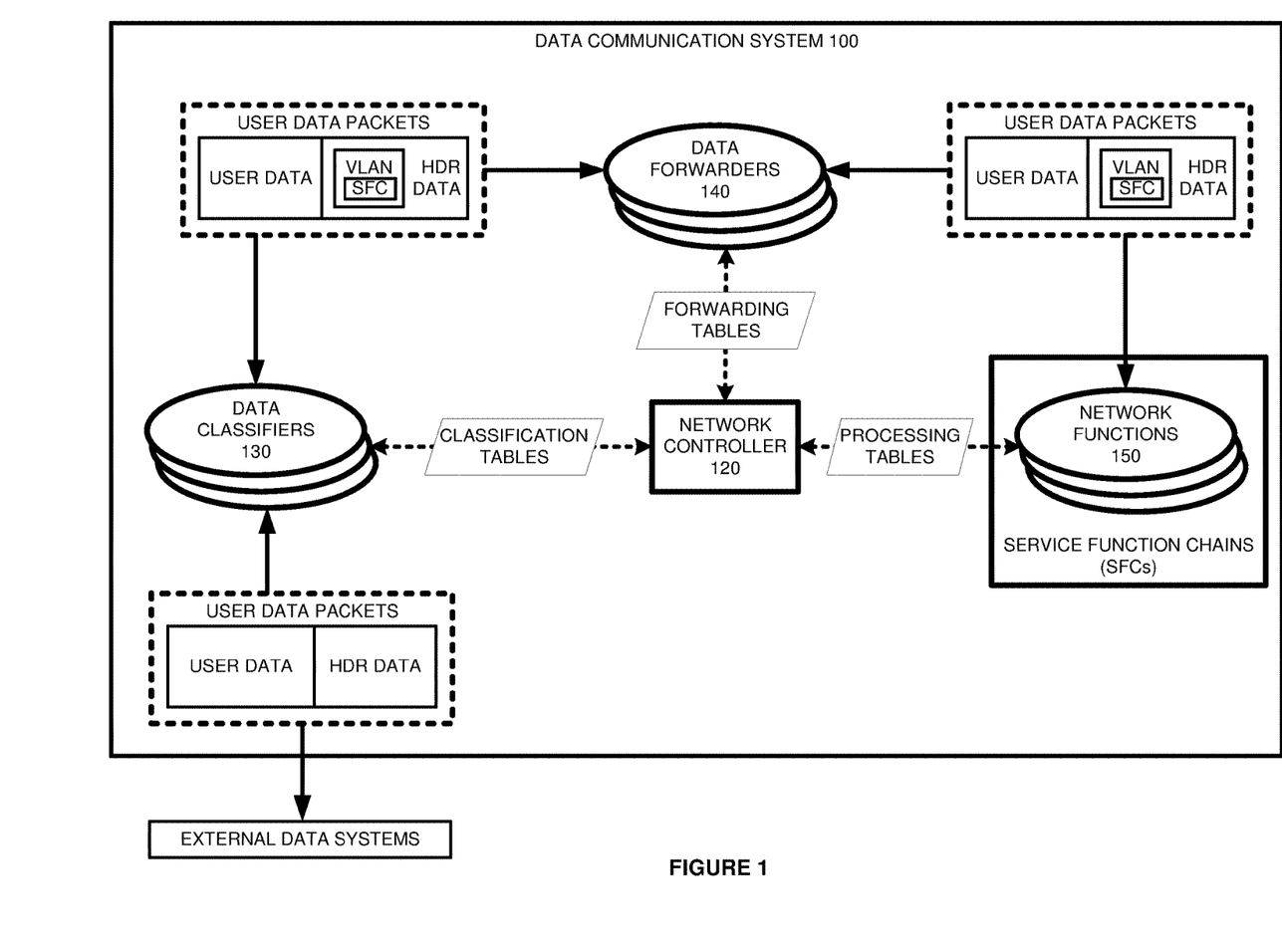
FIGS. 1-5 illustrate a data communication system that transfers user data packets over Service Function Chains (SFCs).

FIGS. 1-5 illustrate data communication system 100 to transfer user data packets over Service Function Chains (SFCs). The SFCs in data communication system 100 support data communication services like media streaming, internet access, machine communications, or some other computerized information service. Referring to FIG. 1, data communication system 100 comprises network controller 120, data classifiers 130, data forwarders 140, and network functions 150. Various combinations of network functions 150 comprise the SFCs.

Data classifiers 130 exchange user data packets between external data systems and data forwarders 140. For ingress user data packets, data classifiers 130 identify and insert SFC IDs and possibly metadata into the Virtual Local Area Network Identifier (VLAN ID) data fields of the user data packets. For example, a data classifier may exchange Internet Protocol (IP) packets with multiple IP routers, and based on classification rules, the data classifier may correlate a specific IP prefix in the ingress user data packets to a specific SFC ID and media format. The data classifier then inserts the SFC ID and media format metadata in the VLAN ID data fields of these user data packets.

Data forwarders 140 process the SFC IDs and metadata in the VLAN ID data fields to exchange the user data packets between data classifiers 130 and network functions 150. Data forwarders 140 may modify the SFC IDs and metadata in some cases. Network functions 150 read and process the SFC IDs and metadata from the VLAN ID data fields to process the user data packets through the SFCs.

To control the data flows through the SFCs, network controller 120 maintains classification tables, forwarding tables, and processing tables. The classification tables include rules to identify SFC IDs and SFC metadata for ingress user data packets. The classification tables also include rules to reclassify user data packets with new SFC IDs and metadata. For example, a classification table may correlate individual Layer 3 IP prefixes with individual SFC IDs and correlate individual Layer 4 IP ports to individual media types. In another example, a classification table may correlate an SFC ID and metadata to a new SFC and new metadata for SFC reinsertion. Network controller 120 transfers the classification tables to data classifiers 130.

The forwarding tables include rules for transferring the user data packets based on SFC IDs and metadata. The forwarding tables may also include rules for modifying the SFC IDs and metadata. For example, a forwarding table may correlate an individual SFC ID and last-hop network function to a next-hop network function. The forwarding table may include instructions for the SFC ID to update a function hop count in the SFC metadata. Network controller 120 transfers the forwarding tables to data forwarders 140.

The processing tables include rules for processing user data packets based SFC IDs and metadata. The processing tables may include rules for modifying the SFC IDs and metadata. For example, a processing table may correlate an SFC ID with new QoS metadata. In another example, a processing table may correlate an SFC ID and a user application ID with an SFC metadata code to reclassify the user data packets at a subsequent data classifier. Network controller 120 transfers the processing tables to network functions 150.

For ingress user data packets, data classifiers 130 apply their classification rules to identify SFC IDs and SFC metadata. For example, a data classifier may process IP packet header address to select an SFC ID and QoS metadata for the user data flow. Data classifiers 130 insert the SFC IDs and any SFC metadata into the VLAN ID data fields of the ingress user data packets. One VLAN ID data field may be used for economy, or multiple VLAN ID data fields may be used for SFC metadata. Per the classification rules, data classifiers 130 transfer the ingress user data packets to data forwarders 140.

Data forwarders 140 read the SFC IDs and metadata from the VLAN ID data fields of the ingress user data packets. Data forwarders 140 apply the forwarding rules based on the SFC IDs and metadata to select next-hop network functions 150. In some examples, data forwarders 140 may modify the SFC IDs or metadata per the forwarding rules. For example, data forwarders 140 may maintain a network function hop count in the SFC metadata that indicates the number of network functions that have processed the user data packet. Per the forwarding rules, data forwarders 140 transfer the ingress user data packets to network functions 150.

Network functions 150 read the SFC IDs and SFC metadata from the VLAN ID data fields in the ingress user data packets. Network functions 150 process the ingress user data packets to apply their functions per their processing rules. Exemplary network functions include address translation, security coding, data inspection, authenticating and authorizing, accounting, transcoding, routing, and the like. Network functions 150 may modify SFC IDs and metadata for the user data packets per the processing rules. Network functions 150 may request new SFC IDs for the user data flow by inserting a reclassification code in the SFC metadata. Network functions 150 transfer the processed user data packets back to data forwarders 140.

For processed user data packets from network functions 150, data forwarders 140 read the SFC IDs and metadata from the VLAN ID data fields. Data forwarders 140 apply the forwarding rules—typically based on the last-hop network function and SFC ID—to select a next-hop network function or data classifier. Data forwarders 140 may modify the SFC IDs or metadata based on their forwarding rules. Data forwarders 140 often transfer the processed user data packets back to network functions 150 for additional SFC processing. Data forwarders 140 may transfer the processed user data packets to data classifiers 130 for SFC reclassification. Although not shown for clarity, data forwarders 140 may also transfer the processed user data packets to system egress for delivery to external data systems based on the data forwarder policy.

For egress user data packets that need reclassification, data classifiers 130 apply their classification rules to transfer the user data packets to the external data systems. Instead of egress, data classifiers 130 may identify new SFC IDs and metadata for SFC reinsertion by data forwarders 140. For example, a data classifier may process an SFC ID and a user application ID in an egress packet to select a new SFC ID and new QoS metadata for reinsertion into an encryption SFC. Data classifiers 130 transfer reclassified user data packets back to data forwarders 140 with the new SFC IDs and metadata in their VLAN ID data fields.

Data communication network 100 comprises computer hardware and software. The computer hardware includes Central Processing Units (CPUs), Physical Network Interface Cards (PNICs), Random Access Memory (RAM), data storage devices, bus interfaces, and the like. The computer hardware and software may be geographically centralized, or the computer hardware and software may be geographically distributed and coupled over physical data links.

In some examples, data classifiers 130 and data forwarders 140 comprise hypervisor virtual switch components in a Network Function Virtualization Infrastructure (NFVI). In other examples, data classifiers 130 and data forwarders 140 comprise containers in the NFVI. In yet other examples, data classifiers 130 and data forwarders 140 reside in physical Network Interface Cards (NICs) or Layer 2 data switches. Although data classifiers 130 and data forwarders 140 are typically deployed in a virtual computer environment, data classifiers 130 and forwarders 140 may reside and/or execute in other types of physical network elements.

Network functions 150 may comprise Virtual Network Functions (VNFs) or VNF Components (VNFCs) in an NFVI. A VNFC typically executes through a virtual machine or container in the NFVI. Network controller 120 may comprise one or more Software-Defined Network (SDN) controllers, and the SDN controllers may implement the Open Flow protocol. The SDN controllers could also be integrated within a Network Function Virtualization (NFV) Management and Orchestration (MANO) system.

Figure 2:
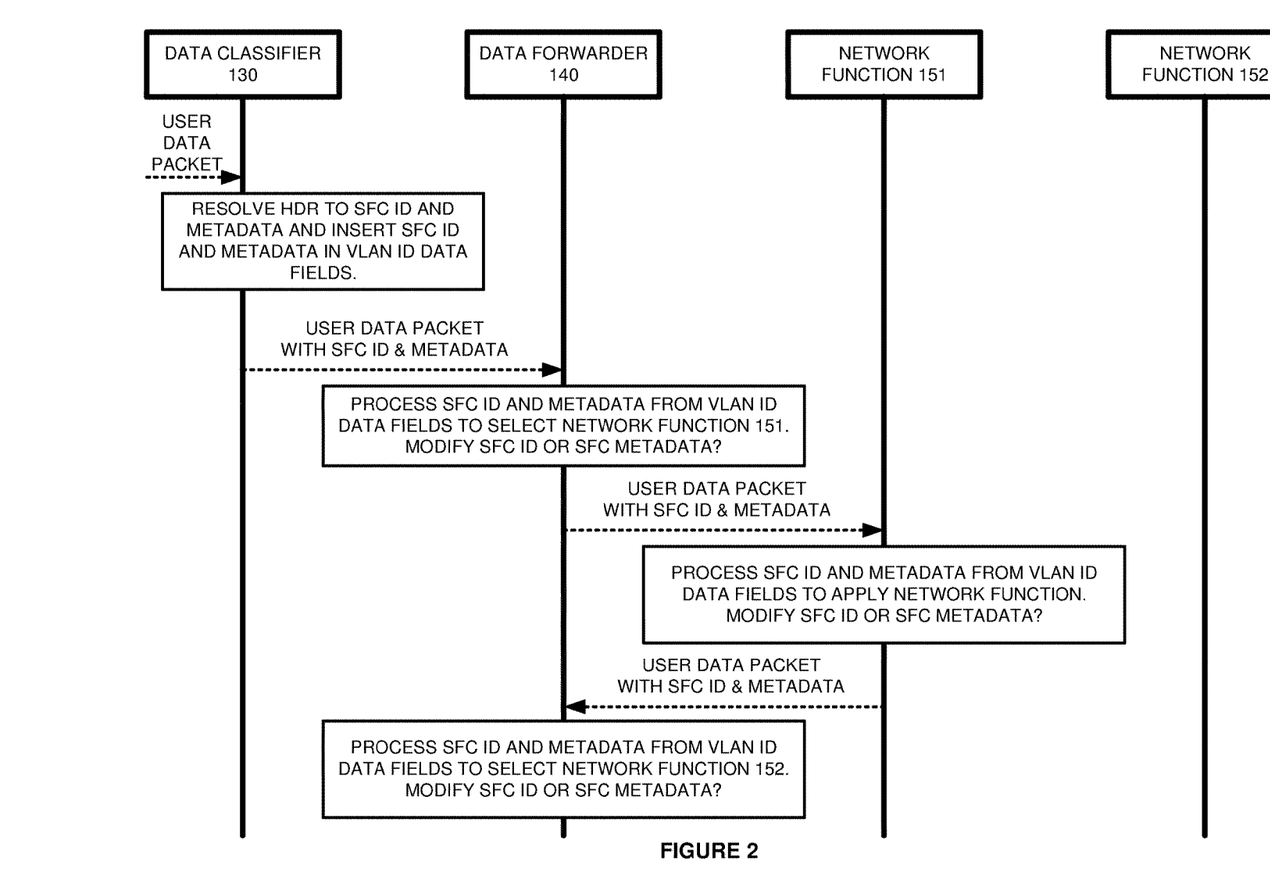

Referring to FIG. 2, the operations of data communication system 100 are described for an individual user data packet. Note that the network control operations to maintain and distribute the classification, forwarding, and processing tables have already occurred. Data classifier 130 receives a user data packet transferred from an external data system. Data classifier 130 resolves the packet header into an SFC ID and metadata. Data classifier 130 loads the SFC ID and metadata into the VLAN ID data fields of the user data packet. Data classifier 130 transfers the classified user data packet with the SFC ID and metadata in the VLAN ID data fields to data forwarder 140.

Data forwarder 140 identifies the SFC ID and metadata from the VLAN ID data fields of the user data packet. Data forwarder 140 selects next-hop network function 151 based on the SFC ID, metadata, and forwarding rules. Data forwarder 140 may also modify the SFC ID or metadata based on the forwarding rules. For example, data forwarders 140 may maintain a network function hop count in the SFC metadata of the user data packet. Data forwarder 140 transfers the user data packet with the SFC ID and SFC metadata in the VLAN ID data fields to network function 151.

Network function 151 identifies the SFC ID and SFC metadata from the VLAN ID data fields in the user data packet. Network function 151 processes the user data packet per the processing rules, SFC ID, and metadata. For example, network function 151 may translate internet addressing in the packet header. Network function 151 may also modify the SFC ID or metadata for the user data packet per the processing rules. For example, network function 151 may add a user application ID or media format indicator to the SFC metadata in the user data packet. Network function 151 returns the processed user data packet back to data forwarder 140.

Data forwarder 140 identifies the SFC ID and metadata from the VLAN ID data fields of the user data packet. Data forwarder 140 applies the forwarding rules based on the last hop (network function 151), SFC ID, and metadata to select a next-hop for the user data packet. Last-hop network function 151 may also indicate next-hop network function 152 in the user data packet. In this example, data forwarder 140 selects network function 152 for more SFC processing.

Figure 3:
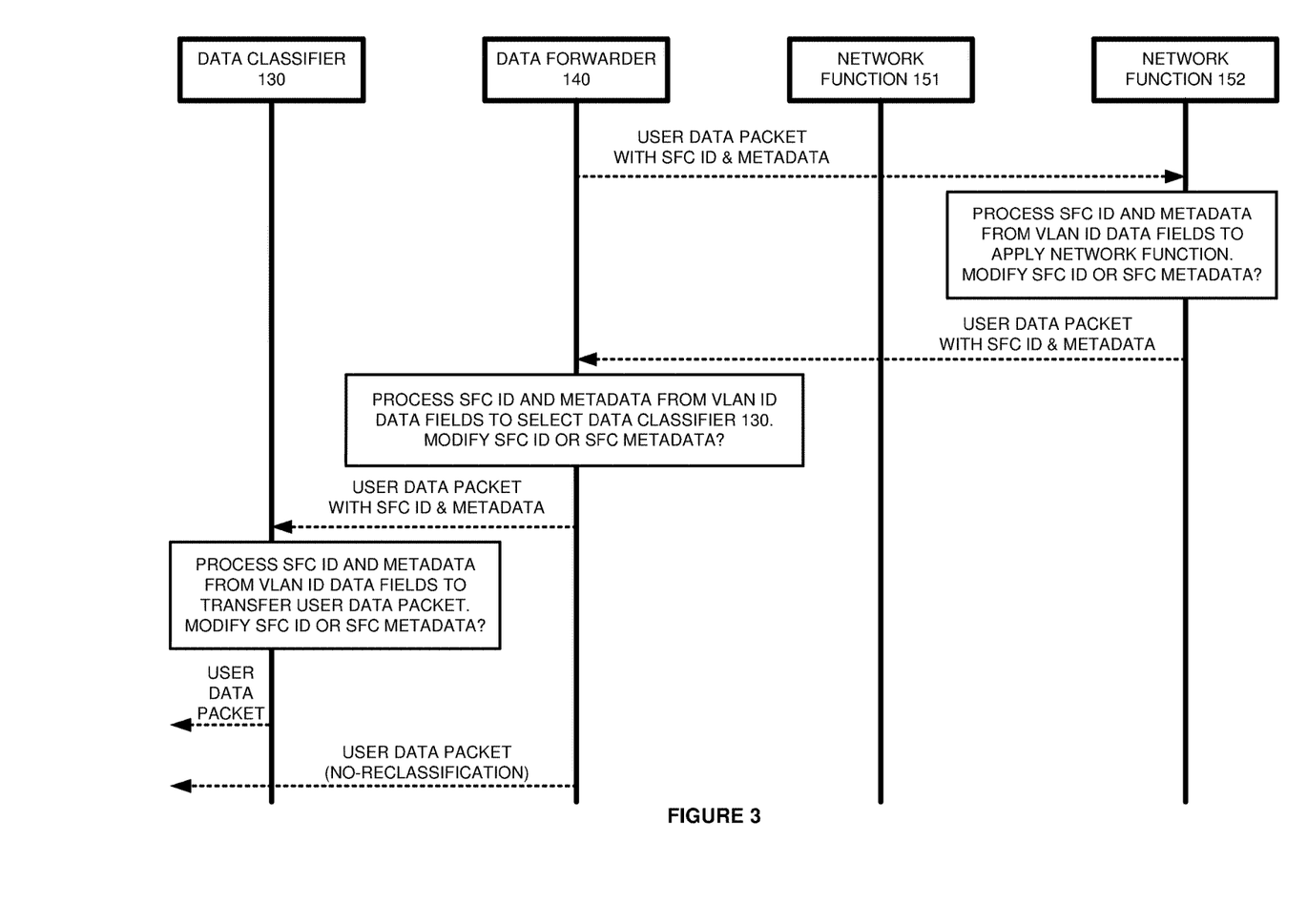

Referring to FIG. 3, the operational discussion of FIG. 2 is continued. Data forwarder 140 transfers the user data packet to selected network function 152. Network function 152 identifies the SFC ID and SFC metadata from the VLAN ID data fields of the user data packet. Network function 152 processes the user data packet per the processing rules, SFC ID, and metadata. For example, network function 152 may decrypt some of the user data based on the SFC ID and SFC security metadata. Network function 152 returns the processed user data packet to data forwarder 140.

Data forwarder 140 identifies the SFC ID and SFC metadata from the VLAN ID data fields of the user data packet. Data forwarder 140 applies the forwarding rules based on the last hop (network function 152), SFC ID, and metadata to select a next-hop for the user data packet. Last-hop network function 152 may also indicate SFC termination in the user data packet.

In some examples, data forwarder 140 may select data classifier 130 and transfer the user data packet with the SFC ID and metadata in the VLAN ID data back to data classifier 130. Data classifier 130 may then reclassify the user data packet for SFC reinsertion. In other examples, data forwarder 140 processes the SFC ID and metadata per the classification rules to select an external data system (no reclassification). Data forwarder 140 typically strips the SFC data from the VLAN ID data fields and transfers the processed user data packet for delivery to the selected external data system. A virtual switch and router may transfer the user data packets from data forwarder 140 to a physical egress port for external transfer to the external data system. The virtual switch and router may also transfer the user data packets from data forwarder 140 back to data classifier 130 or another data classifier.

Figure 4:
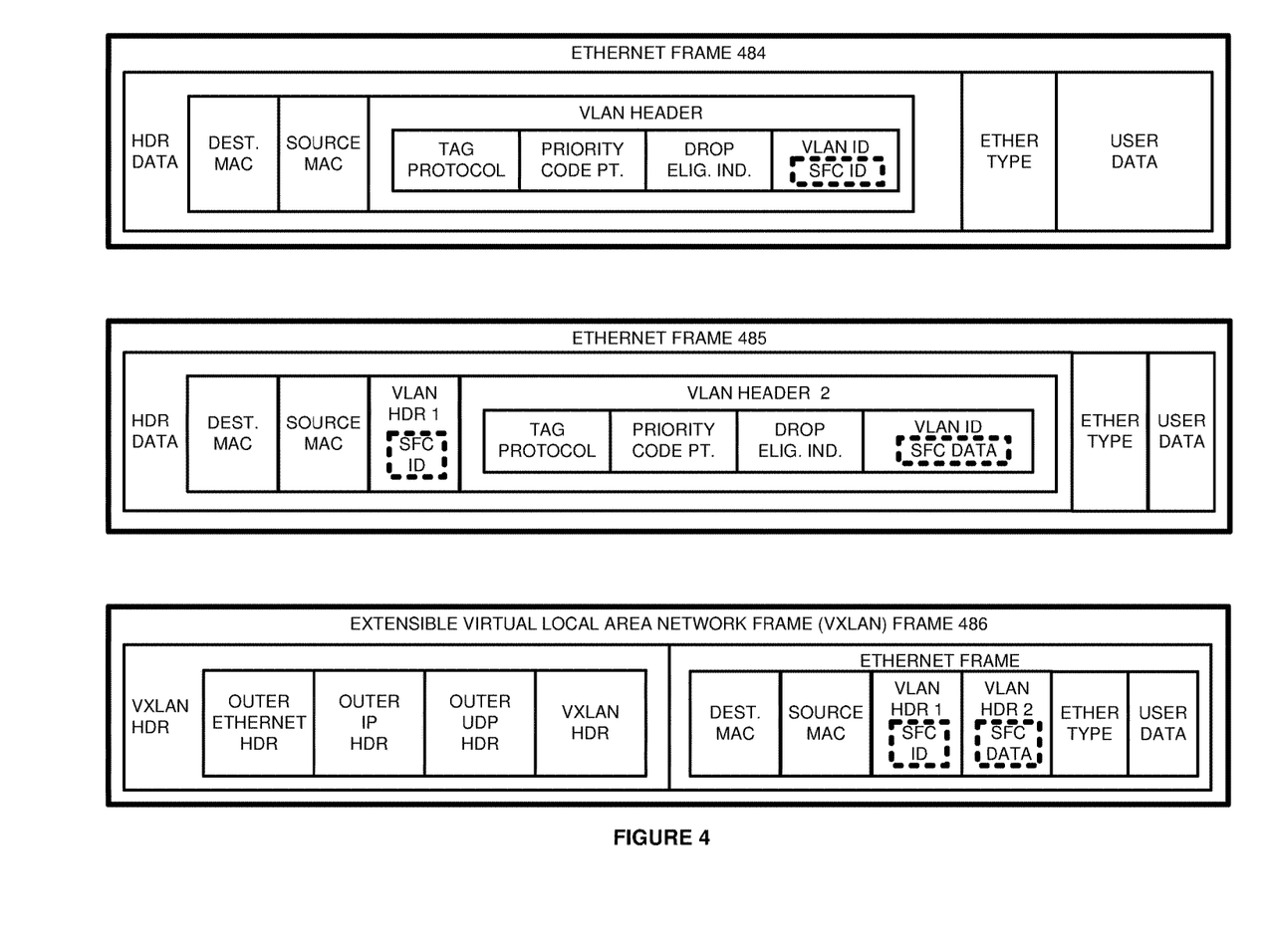

FIG. 4 illustrates exemplary user data packets that have SFC IDs and possibly SFC metadata in their VLAN ID data fields. At the top of the figure, Ethernet frame 484 has header (HDR) data and user data. The header data includes a destination Media Access Control (MAC) address, source MAC address, VLAN header, and Ether Type field. The VLAN header includes a tag protocol indicator, a priority code point (PT.), a drop eligibility indicator (ELIG. IND.), and a VLAN ID data field. The 12-bit VLAN ID data field includes the SFC ID, and the SFC ID is typically a numeric string that is used for SFC isolation. Data communication system 100 performs SFC processing based on the SFC ID in the VLAN ID data field. Ethernet frame 484 may use IEEE 802.1Q.

In the middle of the figure, Ethernet frame 485 also has header data and user data. The header data includes the destination MAC address, source MAC address, two VLAN headers, and an Ether Type field. The first VLAN header field includes the SFC ID in its VLAN ID data field. The second VLAN header also includes a tag protocol indicator, priority code point, drop eligibility indicator, and VLAN ID data field. In the second VLAN header, the VLAN ID data field includes SFC metadata. The SFC metadata may indicate hop count, data type, QoS level, user application ID, media format, security protocol, signaling format, or some other SFC information. Data communication system 100 performs SFC processing based on the SFC ID and the SFC metadata in the two 12-bit VLAN ID data fields. Additional VLAN headers with additional SFC metadata may be added as desired. Ethernet frame 485 may use IEEE 802.1Q and IEEE 802.1ad with QinQ encapsulation.

At the bottom of the figure, Extensible Virtual Local Area Network (VXLAN) frame 486 is shown. VXLAN frame 486 has a VXLAN header and an Ethernet frame. The Ethernet frame has an SFC ID and SFC metadata in two VLAN header fields. The VXLAN header comprises an Ethernet header, IP header, User Datagram Protocol (UDP) header, and VXLAN header. The VXLAN header data may specify a tunnel from a virtual switch port to a Virtual Network Interface Card (VNIC). The SFC ID and metadata are in the Ethernet frame of VXLAN frame 486. VXLAN frame 486 may use IETF RFC 7348, IEEE 802.Q, and IEEE 802.ad with QinQ encapsulation.

Some current data systems insert a Network Service Header (NSH) between the VXLAN header and the Ethernet frame. Note that frames 484-486 use the VLAN ID data fields to transport SFC IDs and SFC metadata. The embedded SFC IDs and metadata allow the NSH to be omitted altogether from frames 484-486. Advantageously, data communication system 100 saves significant networking resources on a per-frame basis. The networking resource savings may be re-deployed to the network users.

An exemplary encoding scheme for the SFC IDs and metadata is described, although various other encoding schemes could be used. The first VLAN ID data field carries a 12-bit SFC ID. The second VLAN ID data field carries 12 bits of SFC metadata. In one example, 6-bits of SFC metadata may be a hop count, and 6-bits of SFC metadata could be a traffic type or a QoS level. In another example, 3-bits of SFC metadata may be a data type, and 9-bits of SFC metadata could be a traffic type, user application ID, or QoS level.

Numerical ranges can be used to specify the SFC metadata. For example, the numeric range 0100-4094 may be used as follows. Web traffic may use VLAN IDs 0100-0200 to indicate SFC metadata where: 0100=direct traffic, 0101=referral traffic, 0102=organic traffic, 0103=social traffic, 0104=Hypertext Transfer Protocol (HTTP) traffic, and 0105=HTTP Secure (HTTPS) traffic. Quality-of-Service (QoS) traffic may use VLAN IDs 0201-0300 to indicate SFC metadata where: 0201=sensitive traffic, 0202=best-effort traffic, 0203=undesired traffic, 0204=social traffic, and 0205 =parental control traffic. Secure Shell (SSH) traffic may use VLAN IDs 0301-0400, and Secure Sockets Layer (SSL) traffic may use VLAN IDs 0401-0500. Voice/Audio traffic may use VLAN IDs 0501-0600 to indicate SFC metadata where: 501=H.248 traffic, 0502=Session Initiation Protocol (SIP) traffic=0502, Real-Time Protocol (RTP) traffic=0503, and 0600=Unknown. Video traffic may use VLAN IDs 0601-0700, and signaling traffic may use VLAN IDs 0701-0800. Routing traffic may use VLAN IDs 0801-0900. Application traffic may use VLAN IDs 1901-2000. Other VLAN IDs 2001-4094 could be reserved for future use.

Figure 5:
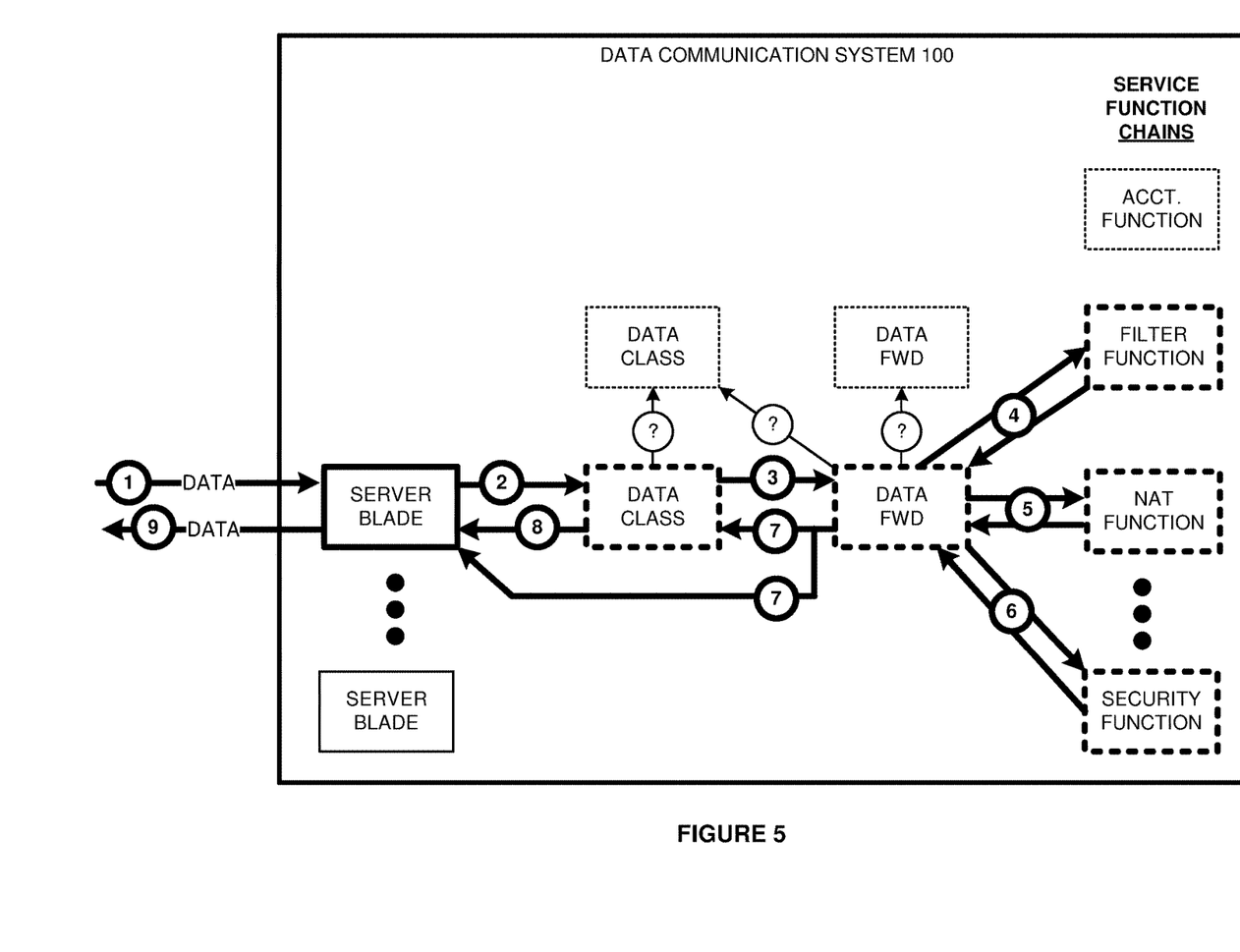

Referring to FIG. 5, a user data flow through an SFC of data communication system 100 is illustrated. In addition to data classifiers (CLASS) and data forwarders (FWD), the SFCs are shown with an accounting (ACCT.) function, filter function, network address translation (NAT) function, and security function. In a first operation (1), a server blade receives a user data packet.

In a second (2) operation, the server blade invokes a data classifier for the user data—typically through a hypervisor virtual switch or an operating system. The data classifier determines an SFC ID and metadata and inserts the SFC ID and metadata in the VLAN ID data field of the user data. For example, the data classifier may process an IP address and port in the user data to select the SFC ID and QoS metadata.

In a third (3) operation, the data classifier transfers the classified user data with the SFC ID and metadata in the VLAN ID data fields to a data forwarder. Alternatively, the data classifier may transfer the classified user data with the SFC ID and metadata in the VLAN ID data fields to another classifier.

In a fourth (4) operation, the data forwarder reads the SFC ID and metadata from the VLAN ID data fields and selects the filter function. Alternatively, the data forwarder could have transferred the user data to another classifier or forwarder. The data forwarder may modify or augment the SFC ID and/or metadata in the VLAN ID data fields. The data forwarder transfers the user data with the SFC ID and metadata in the VLAN ID data fields to the filter function. The filter function scans the user data for inappropriate content and returns the user data to the data forwarder. The filter function may modify or augment the SFC ID and/or metadata in the VLAN ID data fields. For example, the filter function may indicate the completed filtering process in the SFC metadata. The filtering function may validate that all data is correct and forward the packet to the next virtual NAT function without changing the SFC ID and/or metadata in the VLAN ID fields.

In a fifth (5) operation, the data forwarder reads the SFC ID and metadata from the VLAN ID data fields and selects the NAT function. Alternatively, the data forwarder could have transferred the user data to another classifier or forwarder. The data forwarder may modify or augment the SFC ID and/or metadata in the VLAN ID data fields. The data forwarder transfers the user data with the SFC ID and metadata in the VLAN ID data fields to the NAT function. The NAT function adds new IP addressing to the packet headers and returns the user data to the data forwarder. The NAT function may modify or augment the SFC ID and/or metadata in the VLAN ID data fields. For example, the NAT function may indicate a data traffic type in the SFC metadata. The NAT function may validate that all data is correct and forward the packet to the next virtual function in the SFC without making changes to SFC ID and/or metadata in the VLAN ID fields.

In a sixth (6) operation, the data forwarder reads the SFC ID and metadata from the VLAN ID data fields and selects the security function. Alternatively, the data forwarder may transfer the user data to another classifier or forwarder. The data forwarder transfers the user data with the SFC ID and metadata in the VLAN ID data fields to the security function. The security function may modify or augment the SFC ID and/or metadata in the VLAN ID data fields. For example, the security function may encrypt user data and indicate the security protocol in the SFC metadata. The security function may be the last function in the defined SFC.

In a seventh (7) operation, the data forwarder reads the SFC ID and metadata from the VLAN ID data fields and selects the data classifier or the server blade. Alternatively, the data forwarder may transfer the user data to another classifier or forwarder. The data forwarder may modify or augment the SFC ID and/or metadata in the VLAN ID data fields. For example, the data forwarder may update the network function hop count to three in the SFC metadata. The data forwarder transfers the user data with the SFC ID and metadata in the VLAN ID data fields to the data classifier if reclassification is needed. The data forwarder may transfer the user data to the server blade—typically through a virtual switch port or operating system call to the server blade—for delivery to the server blade egress port. The user data was filtered, addressed, and encrypted in the SFC.

In an eighth (8) operation and if reclassification is performed, the data classifier reads the SFC ID and metadata from the VLAN ID data fields and selects the server blade—typically through a virtual switch port or operating system call to the server blade. The data classifier transfers the user data—typically through the virtual switch or operating system—for delivery to the server blade egress port. Alternatively, the data classifier may transfer the user data to another classifier or forwarder.

In a ninth (9) operation the server blade transfers the user data from the egress port. For example, the server blade may transfer the user data packet to an Internet backbone router. Alternatively, the server blade may transfer the user data to another server blade.

Figure 6:
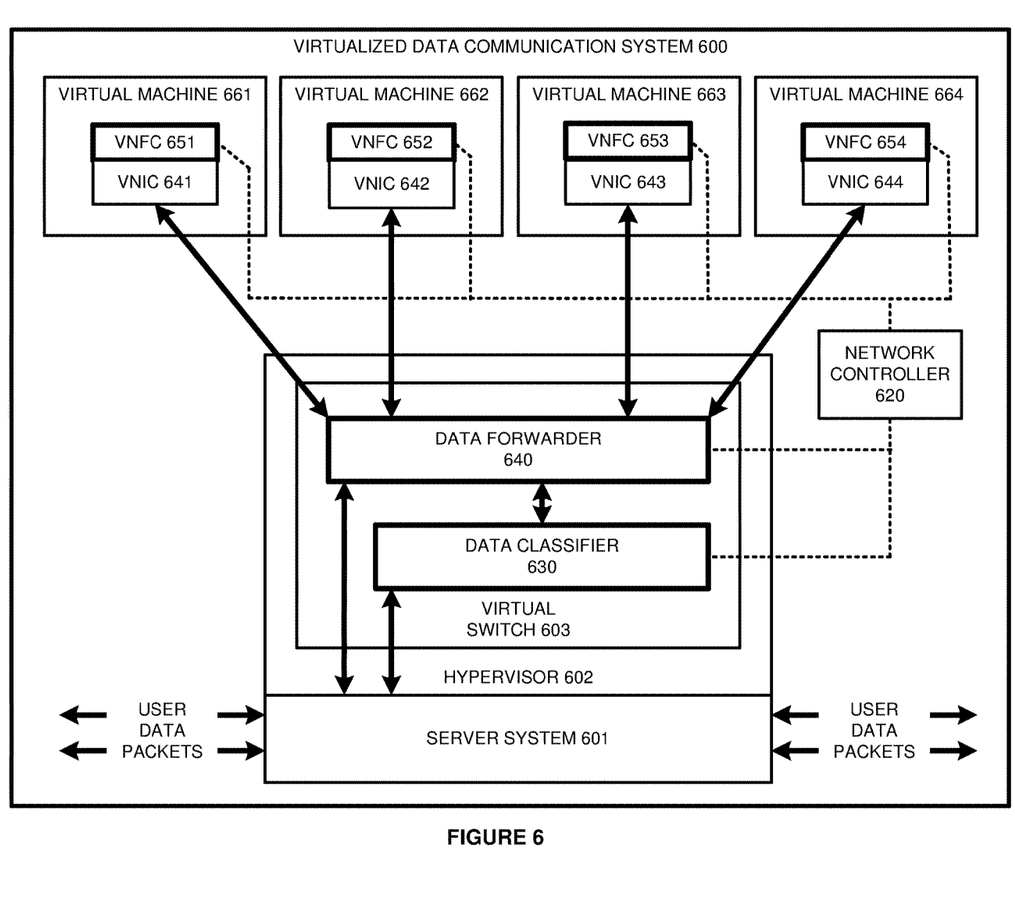
FIG. 6 illustrates a virtualized data communication system that transfers user data packets over SFCs.

FIG. 6 illustrates virtualized data communication system 600 that transfers user data packets over Service Function Chains (SFCs). Virtualized data communication system 600 is an example of data communication system 100, although data communication system 100 may use alternative configurations and operations. Virtualized data communication system 600 comprises server system 601, hypervisor 602, network controller 620, and virtual machines 661-664.

Server system 601 comprises Physical Network Interface Cards (PNICs), Random Access Memory (RAM), Central Processing Units (CPUs), data storage units, bus structures and the like. Hypervisor 602 includes virtual switch 603 that comprises data classifier 630 and data forwarder 640. Virtual switch 603 may be a kernel module of hypervisor 602. Network controller 620 may comprise a Software Defined Network (SDN) controller and SDN applications.

Virtual machine 661 comprises Virtual NIC (VNIC) 641 and Virtual Network Function Component (VNFC) 651. In a like manner, virtual machines 662-663 comprise respective pairs of VNICs 642-644 and VNFCs 652-654. VNFCs 661-664 form a portion of a Network Function Virtualization (NFV) Virtual Network Function (VNF) in an SFC. Exemplary VNFCs 561-564 include firewalls, load balancers, routers and switches, packet inspectors, accounting servers, encryption/decryption units, transcoders, network controllers, policy engines, and network applications.

Network controller 620 maintains classification tables and forwarding tables. The classification tables include rules to identify SFC IDs and SFC metadata for ingress user data packets based on the PNIC, Internet Protocol (IP) address, or some other factor. The SFC metadata may indicate hop count, QoS, data type, media format, security protocol, user application, and the like. The classification tables include rules to route user data packets between virtual switch 603 and data forwarder 640. The classification rules may further specify when to reclassify SFC IDs for reinsertion into new SFCs. For example, the classification rules may specify a SFC ID, QoS, and media format for a given ingress IP prefix. The rules may further specify a new SFC ID (reclassification) if the QoS is increased in the SFC. Network controller 620 transfers the classification tables to data classifier 630.

The forwarding tables include rules to route user data packets between data classifier 630 and VNICs 641-644 based on SFC IDs and metadata. The forwarding rules also specify tasks for metadata like maintaining VNF or VNFC hop counts. The forwarding rules may specify reclassification conditions along with new SFC IDs and metadata. Network controller 620 transfers the forwarding tables to data forwarder 640.

Although not required, network controller 620 may maintain processing tables for VNFCs 651-654. The processing tables include rules to process user data packets based on SFC IDs and metadata. The processing rules may also specify metadata handling like adjusting QoS or requesting reclassification. Network controller 620 transfers the processing tables to VNFCs 651-654.

A PNIC in server system 601 exchanges user data packets with external data systems. Internally, the PNIC in server system 601 exchanges the user data packets with virtual switch 603—typically through server system RAM. In virtual switch 603, data classifier 630 classifies the ingress user data packets per the classification tables. Data classifier 630 inserts the SFC IDs and metadata into Virtual Local Area Network Identifier (VLAN ID) data fields of the ingress user data packets.

Data forwarder 640 forwards the ingress user data packets to VNICs 641-643 per the SFC IDs, metadata, and forwarding tables. Data forwarder 640 maintains a VNIC hop count in the SFC metadata. Data forwarder 640 transfer the ingress user data packets with the SFC IDs and SFC metadata in the VLAN ID data fields to VNICs 641-644. VNICs forward the ingress user data packets to VNFCs 651-654 for SFC processing. VNFCs 651-654 process the ingress user data packets per the SFC IDs, metadata, and processing tables. After SFC processing, VNFCs 651-654 transfer the processed user data packets with the SFC IDs and SFC metadata in the VLAN ID data fields back to VNICs 641-644. VNICs 641-644 forward the processed user data packets to data forwarder 640.

For processed user data packets, data forwarder 640 typically selects additional VNICs based on the last VNIC, SFC ID, and SFC metadata. This VNFC processing repeats within the SFCs, and a user data packet may traverse multiple VNFCs that make up the VNFs in the SFC. Eventually, data forwarder 640 transfers egress user data packets to data classifier 630 if reclassification is needed. Data classifier 630 may then reclassify egress data packets for SFC reinsertion based on new SFC IDs and metadata. Data forwarder 640 may also have virtual switch 603 transfer egress user data packets to specific PNIC ports in server system 601 based on data like a translated destination IP address.

Figure 7:
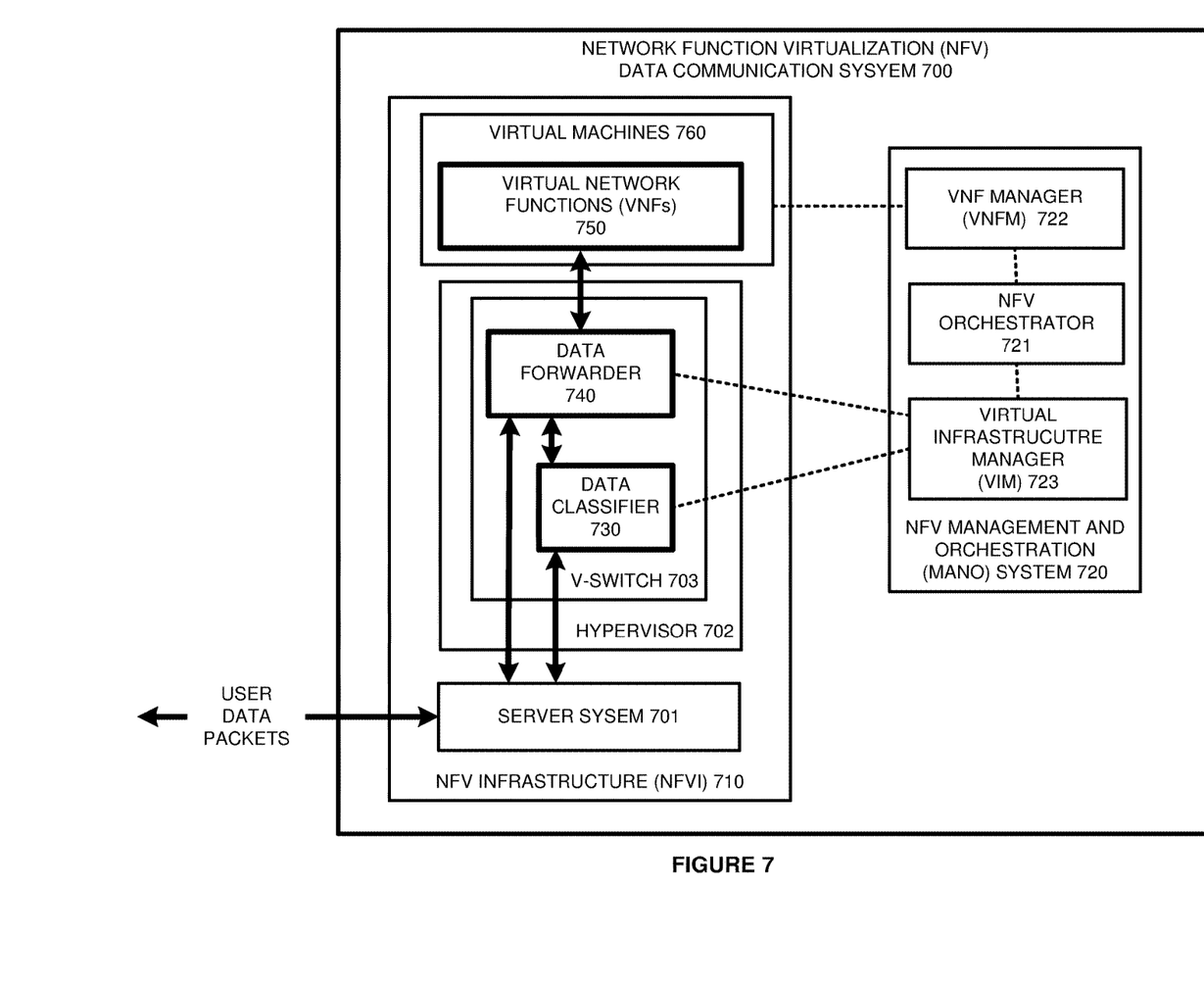
FIG. 7 illustrates a Network Function Virtualization (NFV) data communication system that transfers user data packets over SFCs.

FIG. 7 illustrates Network Function Virtualization (NFV) data communication system 700 that transfers user data packets over SFCs. NFV data communication system 700 is an example of data communication system 100, although data communication system 100 may use alternative configurations and operations. NFV data communication system 700 comprises server system 701, hypervisor 702, NFV Management and Orchestration (MANO) system 720, Virtual Network Functions (VNFs) 750, and virtual machines 760. Hypervisor 702 includes virtual switch 703, and virtual switch 703 comprises data classifier 730 and data forwarder 740. VNFs 750 include routers, gateways, servers, controllers, databases, and other data communication network elements. Groups of VNFs 750 form the SFCs.

MANO system 720 comprises NFV Orchestrator 721, VNF Manager (VNFM) 722, and Virtual Infrastructure Manager (VIM) 723. NFV orchestrator 721 maintains classification tables, forwarding tables, and processing tables. NFV orchestrator 721 directs VIM 723 to transfer the classification tables to data classifier 730 and to transfer the forwarding tables to data forwarder 740. NFV orchestrator 721 directs VNFM 722 to transfer the processing tables to VNFs 750.

Server system 701 exchanges user data packets with external data systems. Data classifier 730 classifies ingress user data packets per its classification tables. Data classifier 730 inserts SFC IDs and metadata into Virtual Local Area Network Identifier (VLAN ID) data fields. Per the forwarding tables, data forwarder 740 forwards the ingress user data packets to virtual machines 760 for delivery to VNFs 750. Data forwarder 740 maintains a virtual machine hop count in the SFC metadata. Virtual machines 760 deliver the inbound user data packets to VNFs 750 for SFC processing.

Individual VNFs 750 process the inbound user data packets per the SFC IDs, metadata, and processing tables. After SFC processing, the individual VNFs 750 transfer the processed user data packets with the SFC IDs and SFC metadata in the VLAN ID data fields back to virtual machines 760. Virtual machines 760 forward the processed user data packets to data forwarder 740.

For processed user data packets, data forwarder 740 typically selects another virtual machine based on the last virtual machine, SFC ID, and SFC metadata. The VNF processing repeats until the SFC is completed, terminated, or modified. Data forwarder 740 may transfer egress user data packets from the SFC to data classifier 730 for reclassification. Data classifier 730 may reclassify the egress data packets for SFC reinsertion based on new SFC IDs and metadata. Data forwarder 740 may also direct virtual switch 703 to transfer the ingress data packets from physical egress ports in server system 701 based on a Layer 2 tunnel or IP address.

Figure 8:
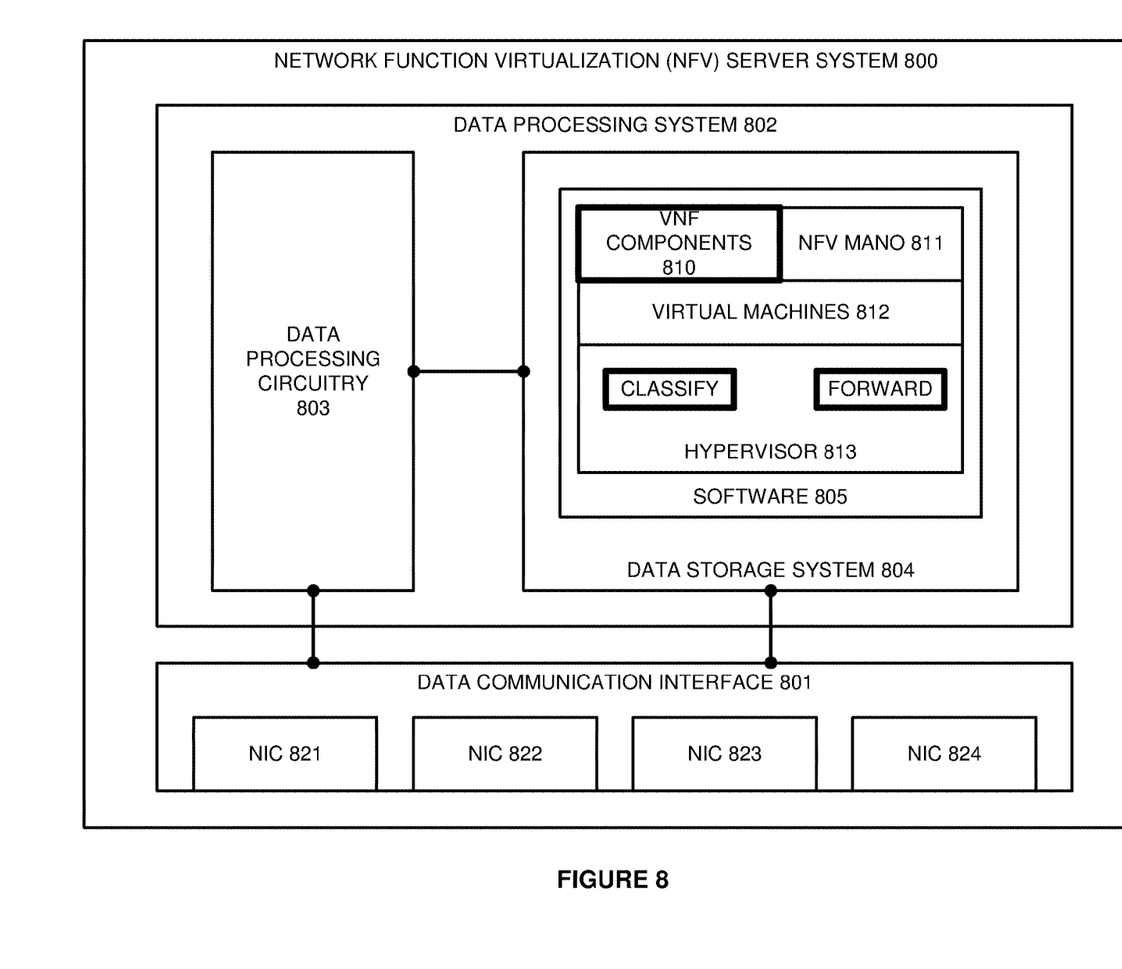
FIG. 8 illustrates an NFV server system that transfers user data packets over SFCs.

FIG. 8 illustrates Network Function Virtualization (NFV) server system 800 that transfers user data packets over SFCs. NFV server system 800 is an example of data communication system 100, although data communication system 100 may use alternative configurations and operations. NFV server system 800 comprises data communication interface 801 and data processing system 802. Data communication interface 801 comprises Network Interface Cards (NICs) 821-824. Data processing system 802 comprises processing circuitry 803 and storage system 804. Storage system 804 stores software 805. Software 805 includes respective software 810-813.

NICs 821-824 comprise communication components, such as ports, bus interfaces, signal processors, memory, software, and the like. Processing circuitry 803 comprises circuit boards, bus interfaces, integrated micro-processing circuitry (CPU and RAM), and associated electronics. Storage system 804 comprises non-transitory, machine-readable, data storage media, such as flash drives, disc drives, memory circuitry, data servers, and the like. Software 805 comprises machine-readable instructions that control the operation of processing circuitry 803 when executed. All or portions of software 810-813 may be externally stored on one or more storage media, such as memory circuitry, discs, and the like. Some conventional aspects of NFV server system 800 are omitted for clarity, such as power supplies, enclosures, and the like. NFV server system 800 may be centralized or distributed.

When executed by processing circuitry 803, software 810-813 direct circuitry 803 to perform the following operations. Virtual Network Function (VNF) components 810 perform functions like routing, filtering, accounting, controlling, and encoding based on SFC IDs and metadata in VLAN data fields. NFV Management and Orchestration (MANO) 811 maintain and transfer classification and forwarding tables to hypervisor modules 813. NFV MANO 811 maintain and transfer processing tables to VNF component modules 810. Virtual machines 812 support VNF components 810 and NFV MANO 811. Hypervisor 813 includes data classifiers and forwarders to classify and forward user data packets based on SFC IDs and metadata in the VLAN ID data fields.

Figure 9:
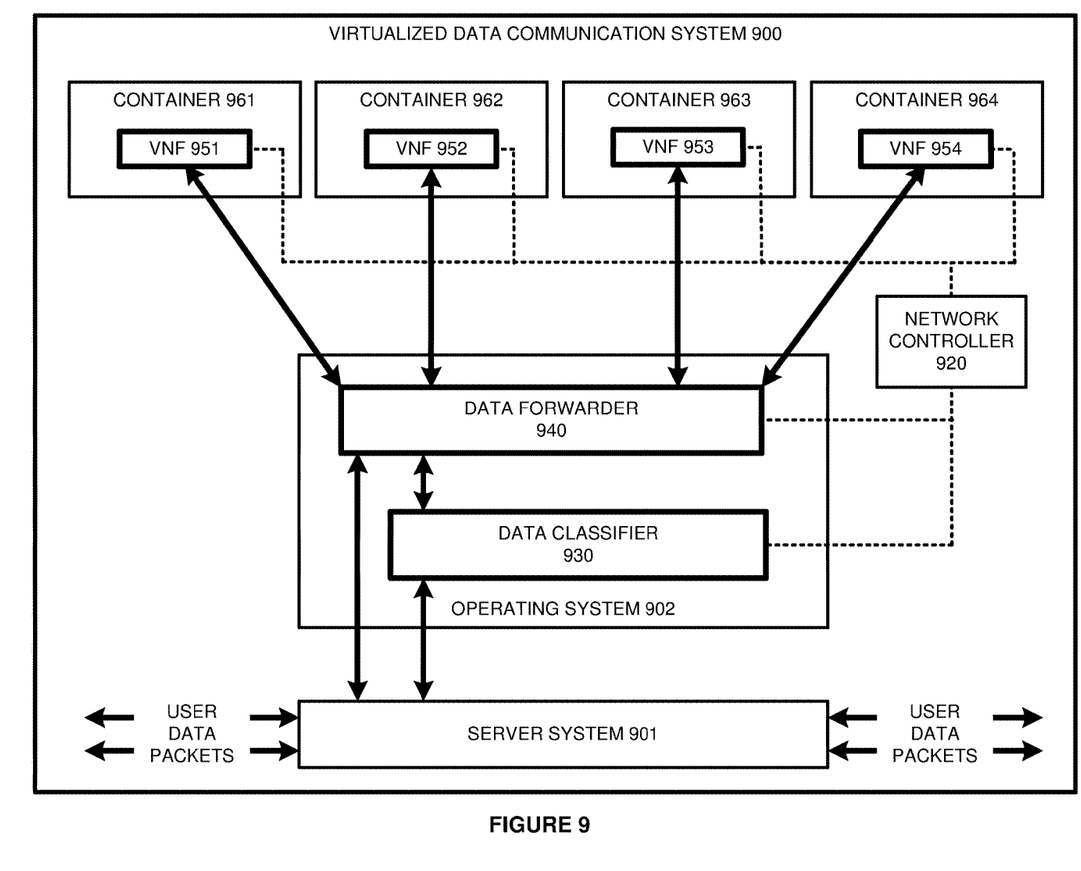
FIG. 9 illustrates a virtualized data communication system that transfers user data packets over SFCs.

FIG. 9 illustrates virtualized data communication system 900 that transfers user data packets over Service Function Chains (SFCs). Virtualized data communication system 900 is an example of data communication system 100, although data communication system 100 may use alternative configurations and operations. Virtualized data communication system 900 comprises server system 901, operating system 902, network controller 920, and containers 961-964. Containers 961-964 have separate user name spaces and run on operating system 902 without a hypervisor or a separate operating system. Server system 901 comprises CPUs, RAM, data storage units, and PNICs. Operating system 902 includes data classifier 930 and data forwarder 940. Data classifier 930 and data forwarder 940 may be kernel modules of operating system 902. Network controller 920 may comprise a Software Defined Network (SDN) controller and SDN application. Network controller 920 may comprise an NFV MANO system.

Virtual Network Functions (VNFs) 951-954 form an SFC. Container 961 executes VNF 951. In a like manner, containers 962-964 execute VNFs 952-954. Exemplary VNFs 961-964 include routers, switches, gateways, controllers, databases, and the like. Network controller 920 maintains classification tables and forwarding tables. The classification tables include rules to identify SFC IDs and SFC metadata for ingress user data packets based on PNIC, Internet Protocol (IP) addressing, and/or some other factor. The classification tables may also include rules to route the user data packets to data forwarder 940. The classification rules may further specify when to reclassify SFC IDs for reinsertion into new SFCs. Network controller 920 transfers the classification tables to data classifier 930. The forwarding tables include rules to route user data packets between data classifier 930 and VNFs 951-954 based on SFC IDs and metadata. The forwarding rules may also specify metadata handling like maintaining VNF hop counts. Network controller 920 transfers the forwarding tables to data forwarder 940.

Server system 901 exchanges user data packets with external data systems under operating system 902 control. In operating system 902, data classifier 930 classifies the ingress user data packets per the classification tables. Data classifier 930 inserts the SFC IDs and metadata into Virtual Local Area Network Identifier (VLAN ID) data fields of the ingress user data packets. In operating system 902, data forwarder 940 forwards the ingress user data packets to VNFs 951-954 per the SFC IDs, metadata, and forwarding tables. Data forwarder 940 maintains a VNF hop count in the SFC metadata.

In containers 961-964, VNFs 951-954 process the ingress user data packets per the SFC IDs and metadata. After SFC processing, VNFs 951-954 transfer the processed user data packets with the SFC IDs and SFC metadata in the VLAN ID data fields back to data forwarder 940. Data forwarder 940 often selects additional VNFs based on the last VNF, SFC ID, and metadata. This VNF processing repeats within the SFC, and a user data packet may traverse multiple VNFs in the SFC. Data forwarder 940 may transfer egress user data packets to data classifier 930 for reclassification. Data classifier 930 may then reclassify the egress user data packets for SFC reinsertion based on SFC IDs and metadata. Data forwarder 940 may also direct operating system 902 to transfer egress data packets from specific PNIC ports based on data like a Layer 2 tunnel or IP address.

The data communication systems described herein may use various data compute nodes, such as non-virtualized physical hosts, virtual machines, containers, and hypervisor kernel network interface modules. Virtual machines operate with their own guest operating systems on a host machine that is virtualized by software like a hypervisor or virtual machine monitor. The tenant, such as the owner of the virtual machine, may choose which applications to operate on the guest operating system. Containers run on the host operating system without the need for a hypervisor or a separate guest operating system. The host operating system uses name spaces to isolate the containers from each other. Therefore, the host operating system provides operating-system level segregation to groups of applications that operate within the different containers. This container segregation is like virtual machine segregation and is a form of virtualization. Hypervisor kernel network interface modules may include a network stack a with hypervisor kernel network interface and with receive/transmit threads. The hypervisor kernel network interface modules may use data compute nodes without virtual machines.

The above description and associated figures teach the best mode of the invention. To teach inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described above can be combined in various ways to form multiple variations of the invention. The invention is not limited to the specific examples described above, but only by the claims and their equivalents.

What is claimed is:

1. A method of operating a computer system to transfer a user data packet over a Service Function Chain (SFC), the method comprising:
   a data classifier receiving the user data packet and determining an SFC Identifier (ID) for the user data packet
   the data classifier inserting the SFC ID in at least one Virtual Local Area Network (VLAN) ID data field of the user data packet and transferring the user data packet having the SFC ID in the at least one VLAN ID data field;
   a data forwarder receiving the user data packet and identifying the SFC ID from the at least one VLAN ID data field; and
   the data forwarder selecting a network function based on the SFC ID and transferring the user data packet having the SFC ID in the at least one VLAN ID data field for delivery to the selected network function.

2. The method of claim 1 further comprising:
   the selected network function receiving the user data packet and identifying the SFC ID from the at least one VLAN ID data field; and
   the selected network function processing the user data packet based on the SFC ID.

3. The method of claim 1 further comprising the data classifier determining a new SFC ID for the user data packet and inserting the new SFC ID in at the least one VLAN ID data field of the user data packet and transferring the user data packet having the new SFC ID in the at least one VLAN ID data field.

4. The method of claim 1 further comprising the data classifier determining SFC metadata for the user data packet and inserting the SFC metadata in the at least one VLAN ID data field.

5. The method of claim 4 further comprising the data forwarder generating new SFC metadata and inserting the new SFC metadata in the at least one VLAN ID data field.

6. The method of claim 4 further comprising the data forwarder determining a network function hop count and inserting the network function count in the SFC metadata in the at least one VLAN ID data field.

7. The method of claim 4 further comprising:
   the selected network function identifying the SFC metadata from the at least one VLAN ID data field; and wherein
   the selected network function processing the user data packet comprises the selected network function processing the user data packet based on the SFC metadata and the SFC ID.

8. The method of claim 4 further comprising the selected network function generating new SFC metadata and inserting the new SFC metadata in the at least one VLAN ID data field.

9. The method of claim 4 wherein the SFC metadata for the user data packet indicates at least one of a data traffic type, a media type, a user application ID, and a Quality-of-Service (QoS) level for the user data packet in the least one VLAN ID data field.

10. A computer apparatus to transfer a user data packet over a Service Function Chain (SFC), the computer apparatus comprising:
    computer processing instructions configured for execution by computer processing circuitry to direct the computer processing circuitry to determine a Service Function Chain (SFC) Identifier (ID) for the user data packet, insert the SFC ID in at least one Virtual Local Area Network (VLAN) ID data field of the user data packet, transfer and receive the user data packet having the SFC ID in the at least one VLAN ID data field, select a network function based on the SFC ID, and transfer the user data packet having the SFC ID in the at least one VLAN ID data field for delivery to the selected network function; and
    one or more non-transitory computer-readable storage media that stores the computer processing instructions.

11. The computer apparatus of claim 10 wherein the computer processing instructions are further configured to direct the computer processing circuitry to apply a network function to the user data packet based on the SFC ID.

12. The computer apparatus of claim 10 wherein the computer processing instructions are further configured to direct the computer processing circuitry to determine a new SFC ID for the user data packet, insert the new SFC ID in at the least one VLAN ID data field of the user data packet and transfer the user data packet having the new SFC ID in the at least one VLAN ID data field.

13. The computer apparatus of claim 10 wherein the computer processing instructions are further configured to direct the computer processing circuitry to determine SFC metadata for the user data packet and insert the SFC metadata in the at least one VLAN ID data field.

14. The computer apparatus of claim 13 wherein the computer processing instructions are further configured to direct the computer processing circuitry to modify the SFC metadata in the at least one VLAN ID data field.

15. The computer apparatus of claim 13 wherein the computer processing instructions are further configured to direct the computer processing circuitry to determine a network function hop count and insert the network function hop count in the SFC metadata in the at least one VLAN ID data field.

16. The computer apparatus of claim 13 wherein the computer processing instructions are further configured to direct the computer processing circuitry to identify the SFC metadata from the at least one VLAN ID data field and process the user data packet based on the SFC metadata.

17. The computer apparatus of claim 13 wherein the SFC metadata for the user data packet indicates at least one of a data traffic type, a media type, a user application ID, and a Quality-of-Service (QoS) level for the user data packet in the least one VLAN ID data field.

18. A computer apparatus to transfer a user data packet over a Service Function Chain (SFC), the computer apparatus comprising:
   computer processing circuitry configured to read and execute computer processing instructions;
   the computer processing instructions configured, when executed by the computer processing circuitry, to direct the computer processing circuitry to determine a Service Function Chain (SFC) Identifier (ID) for the user data packet, insert the SFC ID in at least one Virtual Local Area Network (VLAN) ID data field of the user data packet, transfer and receive the user data packet having the SFC ID in the at least one VLAN ID data field, select a network function based on the SFC ID, and transfer the user data packet having the SFC ID in the at least one VLAN ID data field for delivery to the selected network function; and
   one or more non-transitory computer-readable storage media that stores the computer processing instructions.

19. The computer apparatus of claim 18 wherein the computer processing instructions are further configured to direct the computer processing circuitry to apply a network function to the user data packet based on the SFC ID.

20. The computer apparatus of claim 18 wherein the computer processing instructions are further configured to direct the computer processing circuitry to determine SFC metadata for the user data packet and insert the SFC metadata in the at least one VLAN ID data field.

* * * * *